US 7,426,617 B2

(12) United States Patent
Stager et al.

(10) Patent No.: US 7,426,617 B2
(45) Date of Patent: Sep. 16, 2008

(54) METHOD AND SYSTEM FOR SYNCHRONIZING VOLUMES IN A CONTINUOUS DATA PROTECTION SYSTEM

(75) Inventors: Roger Keith Stager, Livermore, CA (US); Donald Alvin Trimmer, Livermore, CA (US); Pawan Saxena, Pleasanton, CA (US); Randall Johnson, Pleasant Grove, UT (US); Craig Anthony Johnston, Livermore, CA (US); Yafen Peggy Chang, Fremont, CA (US); Rico Blaser, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 742 days.

(21) Appl. No.: 10/772,642

(22) Filed: Feb. 5, 2004

(65) Prior Publication Data

US 2005/0193244 A1      Sep. 1, 2005

Related U.S. Application Data

(60) Provisional application No. 60/541,626, filed on Feb. 4, 2004, provisional application No. 60/542,011, filed on Feb. 5, 2004.

(51) Int. Cl.
*G06F 12/00* (2006.01)
(52) U.S. Cl. ........................... 711/162; 711/161
(58) Field of Classification Search ................ 711/162
See application file for complete search history.

(56) References Cited

U.S. PATENT DOCUMENTS 4,635,145 A    1/1987  Horie et al.
4,727,512 A    2/1988  Birkner et al.

(Continued)

FOREIGN PATENT DOCUMENTS

EP          1 333 379          4/2006

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—Gary Portka
*Assistant Examiner*—Daniel Tsui
(74) *Attorney, Agent, or Firm*—Kolpe and Koenig, P.C.

(57) ABSTRACT

A method for synchronizing a secondary volume with a primary volume in a continuous data protection system begins by scanning a region of the primary volume, which is then compared with a corresponding region of the secondary volume. An identification of the scanned region is stored in a compare delta map when the comparison results in a discrepancy between the scanned region and the corresponding region. Data is copied from the primary volume to the secondary volume, using the compare delta map as a guide to locate the data to copy. If the data protection system has failed just prior to the restore process being initiated, it is termed a re-baseline, and the entire primary volume is scanned. If the data protection system is active prior to the restore process being initiated, it is termed a re-synchronization, and is optimized by scanning only select regions of the primary volume.

10 Claims, 6 Drawing Sheets

U.S. PATENT DOCUMENTS

| | | | |
|---|---|---|---|
| 4,775,969 A | 10/1988 | Osterlund | |
| 5,235,695 A | 8/1993 | Pence | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,854,720 A | 12/1998 | Shrinkle et al. | |
| 5,864,346 A | 1/1999 | Yokoi et al. | |
| 5,872,669 A | 2/1999 | Morehouse et al. | |
| 5,875,479 A * | 2/1999 | Blount et al. | 711/162 |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 * | 10/2001 | Squibb | 714/13 |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara | |
| 6,557,089 B1 | 4/2003 | Reed et al. | |
| 6,578,120 B1 * | 6/2003 | Crockett et al. | 711/162 |
| 6,615,365 B1 | 9/2003 | Jenevein et al. | |
| 6,625,704 B2 * | 9/2003 | Winokur | 711/162 |
| 6,654,912 B1 * | 11/2003 | Viswanathan et al. | 714/42 |
| 6,658,435 B1 * | 12/2003 | McCall | 707/204 |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 * | 2/2005 | Brough et al. | 709/203 |
| 6,877,016 B1 | 4/2005 | Hart et al. | |
| 6,915,397 B2 * | 7/2005 | Lubbers et al. | 711/162 |
| 6,931,557 B2 | 8/2005 | Togawa | |
| 6,950,263 B2 | 9/2005 | Suzuki et al. | |
| 6,973,534 B2 | 12/2005 | Dawson | |
| 6,978,325 B2 | 12/2005 | Gibble | |
| 7,032,126 B2 | 4/2006 | Zalewski et al. | |
| 7,055,009 B2 * | 5/2006 | Factor et al. | 711/162 |
| 7,096,331 B1 * | 8/2006 | Haase et al. | 711/162 |
| 7,100,089 B1 * | 8/2006 | Phelps | 714/42 |
| 7,111,136 B2 * | 9/2006 | Yamagami | 711/162 |
| 7,127,388 B2 | 10/2006 | Yates et al. | |
| 7,155,586 B1 | 12/2006 | Wagner et al. | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0095557 A1 | 7/2002 | Constable et al. | |
| 2002/0144057 A1 | 10/2002 | Li et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0037211 A1 | 2/2003 | Winokur | |
| 2003/0120676 A1 | 6/2003 | Holvanahalli et al. | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0182350 A1 | 9/2003 | Dewey | |
| 2003/0188208 A1 | 10/2003 | Fung | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 * | 6/2005 | Colgrove et al. | 711/162 |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Passerini | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |

FOREIGN PATENT DOCUMENTS

| | | |
|---|---|---|
| EP | 1333379 | 4/2006 |
| EP | 1 671 231 | 6/2006 |
| EP | 1 671231 | 6/2006 |
| WO | WO99/03098 | 1/1999 |
| WO | WO99/06912 | 2/1999 |
| WO | WO2005/031576 | 4/2005 |
| WO | WO2006/023990 | 3/2006 |

| | | |
|---|---|---|
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.
"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.

* cited by examiner

△ = suspect delta map

METHOD AND SYSTEM FOR SYNCHRONIZING VOLUMES IN A CONTINUOUS DATA PROTECTION SYSTEM

CROSS REFERENCE TO RELATED APPLICATION(S)

This application claims priority from U.S. Provisional Application No. 60/541,626, entitled "METHOD AND SYSTEM FOR CONTINUOUS DATA PROTECTION," filed on Feb. 4, 2004; and U.S. Provisional Application No. 60/542,011, entitled "CONTINUOUS DATA PROTECTION IN A COMPUTER SYSTEM," filed on Feb. 5, 2004, which are incorporated by reference as if fully set forth herein.

FIELD OF INVENTION

The present invention relates generally to continuous data protection, and more particularly, to restoring a volume in a continuous data protection system.

BACKGROUND

Hardware redundancy schemes have traditionally been used in enterprise environments to protect against component failures. Redundant arrays of independent disks (RAID) have been implemented successfully to assure continued access to data even in the event of one or more media failures (depending on the RAID Level). Unfortunately, hardware redundancy schemes are ineffective in dealing with logical data loss or corruption. For example, an accidental file deletion or virus infection is automatically replicated to all of the redundant hardware components and can neither be prevented nor recovered from by such technologies. To overcome this problem, backup technologies have traditionally been deployed to retain multiple versions of a production system over time. This allowed administrators to restore previous versions of data and to recover from data corruption.

Backup copies are generally policy-based, are tied to a periodic schedule, and reflect the state of a primary volume (i.e., a protected volume) at the particular point in time that is captured. Because backups are not made on a continuous basis, there will be some data loss during the restoration, resulting from a gap between the time when the backup was performed and the restore point that is required. This gap can be significant in typical environments where backups are only performed once per day. In a mission-critical setting, such a data loss can be catastrophic. Beyond the potential data loss, restoring a primary volume from a backup system can be complicated and often takes many hours to complete. This additional downtime further exacerbates the problems associated with a logical data loss.

The traditional process of backing up data to tape media is time driven and time dependent. That is, a backup process typically is run at regular intervals and covers a certain period of time. For example, a full system backup may be run once a week on a weekend, and incremental backups may be run every weekday during an overnight backup window that starts after the close of business and ends before the next business day. These individual backups are then saved for a predetermined period of time, according to a retention policy. In order to conserve tape media and storage space, older backups are gradually faded out and replaced by newer backups. Further to the above example, after a full weekly backup is completed, the daily incremental backups for the preceding week may be discarded, and each weekly backup may be maintained for a few months, to be replaced by monthly backups. The daily backups are typically not all discarded on the same day. Instead, the Monday backup set is overwritten on Monday, the Tuesday backup set is overwritten on Tuesday, and so on. This ensures that a backup set is available that is within eight business hours of any corruption that may have occurred in the past week.

Despite frequent hardware failures and the necessity of ongoing maintenance and tuning, the backup creation process can be automated, while restoring data from a backup remains a manual and time-critical process. First, the appropriate backup tapes need to be located, including the latest full backup and any incremental backups made since the last full backup. In the event that only a partial restoration is required, locating the appropriate backup tape can take just as long. Once the backup tapes are located, they must be restored to the primary volume. Even under the best of circumstances, this type of backup and restore process cannot guarantee high availability of data.

Another type of data protection involves making point in time (PIT) copies of data. A first type of PIT copy is a hardware-based PIT copy, which is a mirror of the primary volume onto a secondary volume. The main drawbacks to a hardware-based PIT copy are that the data ages quickly and that each copy takes up as much disk space as the primary volume. A software-based PIT, typically called a "snapshot," is a "picture" of a volume at the block level or a file system at the operating system level. Various types of software-based PITs exist, and most are tied to a particular platform, operating system, or file system. These snapshots also have drawbacks, including occupying additional space on the primary volume, rapid aging, and possible dependencies on data stored on the primary volume wherein data corruption on the primary volume leads to corruption of the snapshot. In addition, snapshot systems generally do not offer the flexibility in scheduling and expiring snapshots that backup software provides.

While both hardware-based and software-based PIT techniques reduce the dependency on the backup window, they still require the traditional tape-based backup and restore process to move data from disk to tape media and to manage the different versions of data. This dependency on legacy backup applications and processes is a significant drawback of these technologies. Furthermore, like traditional tape-based backup and restore processes, PIT copies are made at discrete moments in time, thereby limiting any restores that are performed to the points in time at which PIT copies have been made.

A need therefore exists for a system that combines the advantages of tape-based systems with the advantages of snapshot systems and eliminates the limitations described above.

SUMMARY

A method for synchronizing a secondary volume with a primary volume in a continuous data protection system begins by scanning a region of the primary volume. The scanned region is then compared with a corresponding region of the secondary volume. An identification of the scanned region is stored in a compare delta map when the comparison results in a discrepancy between the scanned region and the corresponding region. Data is copied from the primary volume to the secondary volume, using the compare delta map as a guide to locate the data to copy. If the data protection system has failed just prior to the restore process being initiated, it is termed a re-baseline, and the entire primary volume is scanned. If the data protection system is active prior to the restore process being initiated, it is termed a re-synchronization, and is optimized by scanning only select regions of the primary volume. A dirty region log is used to maintain a list of those regions of the primary volume that are to be scanned.

A method for restoring a primary volume from a secondary volume in a continuous data protection system includes the steps of selecting a snapshot of the primary volume to be restored and loading the snapshot from the secondary volume to the primary volume.

A system for synchronizing a secondary volume with a primary volume in a continuous data protection system includes scanning means for scanning a region of the primary volume; comparing means for comparing the scanned region with a corresponding region of the secondary volume; storing means for storing an identification of the scanned region in a compare delta map when the comparing means returns a discrepancy between the scanned region and the corresponding region; and copying means for copying data from the primary volume to the secondary volume, using the compare delta map as a guide to locate the data to copy. If the data protection system has failed just prior to the restore process being initiated, it is termed a re-baseline, and the entire primary volume is scanned. If the data protection system is active prior to the restore process being initiated, it is termed a re-synchronization, and is optimized by scanning only select regions of the primary volume. A dirty region log is used to maintain a list of those regions of the primary volume that are to be scanned.

A system for restoring a primary volume from a secondary volume in a continuous data protection system includes at least one snapshot of the primary volume, each snapshot corresponding to a different point in time; selecting means for selecting a snapshot to be restored; and loading means for loading the selected snapshot from the secondary volume to the primary volume.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

In the present invention, data is backed up continuously, allowing system administrators to pause, rewind, and replay live enterprise data streams. This moves the traditional backup methodologies into a continuous background process in which policies automatically manage the lifecycle of many generations of restore images.

System Construction

Figure 1C:
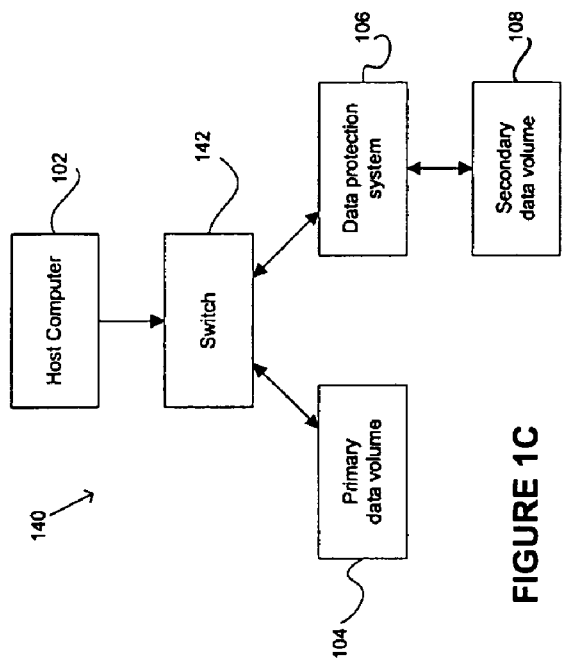
FIGS. 1A-1C are block diagrams showing a continuous data protection environment in accordance with the present invention.
Figure 1A:
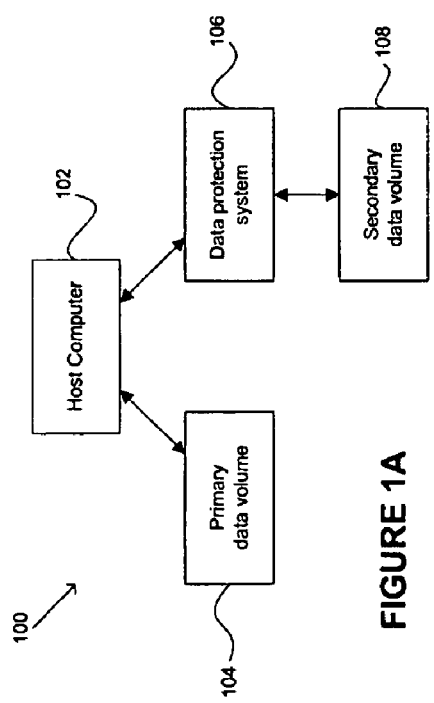

FIG. 1A shows a preferred embodiment of a protected computer system 100 constructed in accordance with the present invention. A host computer 102 is connected directly to a primary data volume 104 (the primary data volume may also be referred to as the protected volume) and to a data protection system 106. The data protection system 106 manages a secondary data volume 108. The construction of the system 100 minimizes the lag time by writing directly to the primary data volume 104 and permits the data protection system 106 to focus exclusively on managing the secondary data volume 108. The management of the secondary volume 108 is preferably performed using a volume manager.

A volume manager is a software module that runs on a server or intelligent storage switch to manage storage resources. Typical volume managers have the ability to aggregate blocks from multiple different physical disks into one or more virtual volumes. Applications are not aware that they are actually writing to segments of many different disks because they are presented with one large, contiguous volume. In addition to block aggregation, volume managers usually also offer software RAID functionality. For example, they are able to split the segments of the different volumes into two groups, where one group is a mirror of the other group. This is, in a preferred embodiment, the feature that the data protection system is taking advantage of when the present invention is implemented as shown in FIG. 1A. In many environments, the volume manager or host-based driver already mirrors the writes to two distinct different primary volumes for redundancy in case of a hardware failure. The present invention is configured as a tertiary mirror target in this scenario, such that the volume manager or host-based driver also sends copies of all writes to the data protection system.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location, as will be explained in detail below. It is noted that there may also be differences in terms of the technologies that are used. The primary volume 104 is typically an expensive, fast, and highly available storage subsystem, whereas the secondary volume 108 is typically cost-effective, high capacity, and comparatively slow (for example, ATA/SATA disks). Normally, the slower secondary volume cannot be used as a synchronous mirror to the high-performance primary volume, because the slower response time will have an adverse impact on the overall system performance.

The data protection system 106, however, is optimized to keep up with high-performance primary volumes. These optimizations are described in more detail below, but at a high level, random writes to the primary volume 104 are processed sequentially on the secondary volume 108. Sequential writes improve both the cache behavior and the actual volume performance of the secondary volume 108. In addition, it is possible to aggregate multiple sequential writes on the secondary volume 108, whereas this is not possible with the random writes to the primary volume 104. The present invention does not require writes to the data protection system 106 to be synchronous. However, even in the case of an asynchronous mirror, minimizing latencies is important.

Figure 1B:
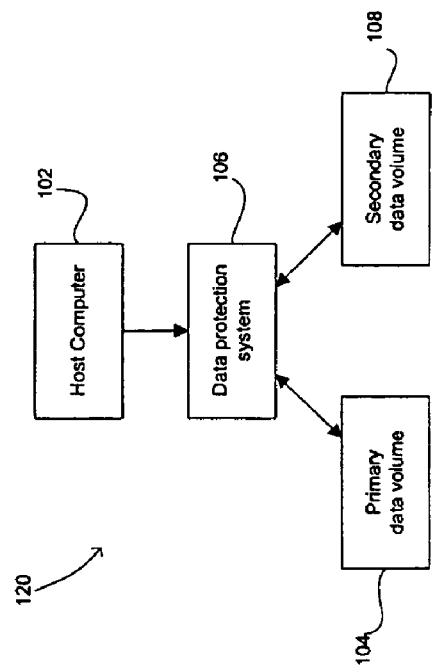

FIG. 1B shows an alternate embodiment of a protected computer system 120 constructed in accordance with the present invention. The host computer 102 is directly connected to the data protection system 106, which manages both the primary data volume 104 and the secondary data volume 108. The system 120 is likely slower than the system 100 described above, because the data protection system 106 must manage both the primary data volume 104 and the secondary data volume 108. This results in a higher latency for writes to the primary volume 104 in the system 120 and lowers the available bandwidth for use. Additionally, the introduction of a new component into the primary data path is undesirable because of reliability concerns.

FIG. 1C shows another alternate embodiment of a protected computer system 140 constructed in accordance with the present invention. The host computer 102 is connected to an intelligent switch 142. The switch 142 is connected to the primary data volume 104 and the data protection system 106, which in turn manages the secondary data volume 108. The switch 142 includes the ability to host applications and contains some of the functionality of the data protection system 106 in hardware, to assist in reducing system latency and improve bandwidth.

It is noted that the data protection system 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

Conceptual Overview

To facilitate further discussion, it is necessary to explain some fundamental concepts associated with a continuous data protection system constructed in accordance with the present invention. In practice, certain applications require continuous data protection with a block-by-block granularity, for example, to rewind individual transactions. However, the period in which such fine granularity is required is generally short (for example, two days), which is why the system can be configured to fade out data over time. The present invention discloses data structures and methods to manage this process automatically.

The present invention keeps a log of every write made to a primary volume (a "write log") by duplicating each write and directing the copy to a cost-effective secondary volume in a sequential fashion. The resulting write log on the secondary volume can then be played back one write at a time to recover the state of the primary volume at any previous point in time. Replaying the write log one write at a time is very time consuming, particularly if a large amount of write activity has occurred since the creation of the write log. In typical recovery scenarios, it is necessary to examine how the primary volume looked like at multiple points in time before deciding which point to recover to. For example, consider a system that was infected by a virus. In order to recover from the virus, it is necessary to examine the primary volume as it was at different points in time to find the latest recovery point where the system was not yet infected by the virus. Additional data structures are needed to efficiently compare multiple potential recovery points.

Delta Maps

Delta maps provide a mechanism to efficiently recover the primary volume as it was at a particular point in time without the need to replay the write log in its entirety, one write at a time. In particular, delta maps are data structures that keep track of data changes between two points in time. These data structures can then be used to selectively play back portions of the write log such that the resulting point-in-time image is the same as if the log were played back one write at a time, starting at the beginning of the log.

Figure 2:
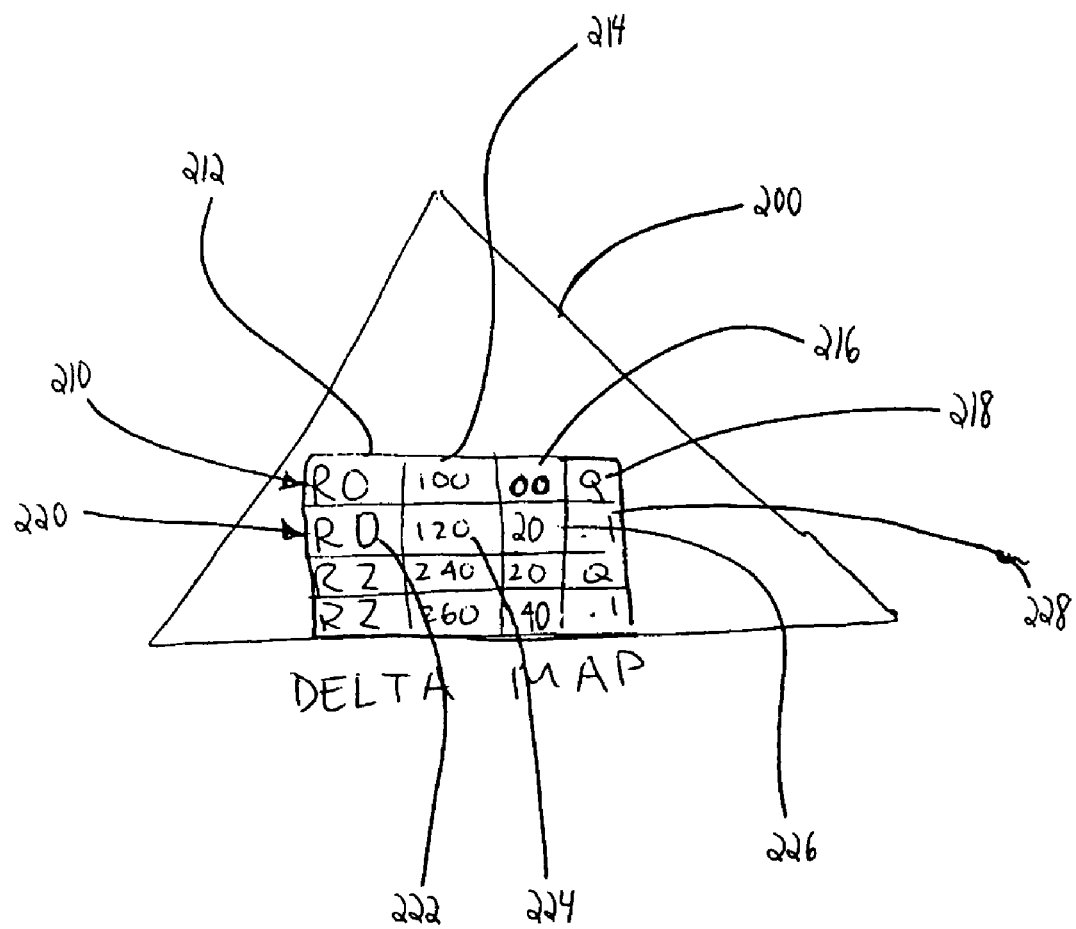
FIG. 2 is an example of a delta map in accordance with the present invention.

FIG. 2 shows a delta map 200 constructed in accordance with the present invention. While the format shown in FIG. 2 is preferred, any format containing similar information may be used. For each write to a primary volume, a duplicate write is made, in sequential order, to a secondary volume. To create a mapping between the two volumes, it is preferable to have an originating entry and a terminating entry for each write. The originating entry includes information regarding the origination of a write, while the terminating entry includes information regarding the termination of a write.

As shown in delta map 200, row 210 is an originating entry and row 220 is a terminating entry. Row 210 includes a field 212 for specifying the region of a primary volume where the first block was written, a field 214 for specifying the block offset in the region of the primary volume where the write begins, a field 216 for specifying where on the secondary volume the duplicate write (i.e., the copy of the primary volume write) begins, and a field 218 for specifying the physical device (the physical volume or disk identification) used to initiate the write. Row 220 includes a field 222 for specifying the region of the primary volume where the last block was written, a field 224 for specifying the block offset in the region of the primary volume where the write ends, a field 226 for specifying the where on the secondary volume the duplicate write ends, and a field 228. While fields 226 and 228 are provided in a terminating entry such as row 220, it is noted that field 226 is optional because this value can be calculated by subtracting the offsets of the originating entry and the terminating entry (field 226=(field 224−field 214)+field 216), and field 228 is not necessary since there is no physical device usage associated with termination of a write.

In a preferred embodiment, as explained above, each delta map contains a list of all blocks that were changed during the particular time period to which the delta map corresponds. That is, each delta map specifies a block region on the primary volume, the offset on the primary volume, and physical device information. It is noted, however, that other fields or a completely different mapping format may be used while still achieving the same functionality. For example, instead of dividing the primary volume into block regions, a bitmap could be kept, representing every block on the primary volume. Once the retention policy (which is set purely according to operator preference) no longer requires the restore granularity to include a certain time period, corresponding blocks are freed up, with the exception of any blocks that may still be necessary to restore to later recovery points. Once a particular delta map expires, its block list is returned to the appropriate block allocator for re-use.

Delta maps are initially created from the write log using a map engine, and can be created in real-time, after a certain number of writes, or according to a time interval. It is noted that these are examples of ways to trigger the creation of a delta map, and that one skilled in the art could devise various other triggers. Additional delta maps may also be created as a result of a merge process (called "merged delta maps") and may be created to optimize the access and restore process. The delta maps are stored on the secondary volume and contain a mapping of the primary address space to the secondary address space. The mapping is kept in sorted order based on the primary address space.

One significant benefit of merging delta maps is a reduction in the number of delta map entries that are required. For example, when there are two writes that are adjacent to each other on the primary volume, the terminating entry for the first write can be eliminated from the merged delta map, since its location is the same as the originating entry for the second write. The delta maps and the structures created by merging maps reduces the amount of overhead required in maintaining the mapping between the primary and secondary volumes.

Dirty Region Log

The purpose of the dirty region log (DRL) mechanism is to track write operations that are in memory but not logged to the secondary volume. Depending on the particular deployment used (shown in FIG. 1), the DRL is administered at a different location. For example, in the case of a host-based driver, the DRL can be located in the driver. Without some type of tracking mechanism, there would not be a record of these operations and a re-synchronization of the primary and secondary volumes after a failure would become an arduous process. The DRL does not keep track of where the primary volume data is being copied to on the secondary volume; it simply and efficiently tracks the locations on the primary volume that are being changed. The re-synchronization function can then use this information to narrow its scanning (i.e., compare and copy) operations to just those regions of the primary volume for which outstanding write operations not recorded in the write logs existed at the time of the failure.

The DRL is implemented in a preferred embodiment as a bit map with the bits representing equally sized regions of the primary volume address space. Each region typically contains multiple logical blocks of the primary volume. A bit set in the DRL indicates that a write operation has been (or at least may have been) initiated for the corresponding region of the primary volume. Since the completion status of the write operation is unknown, that region of the primary volume must be considered as potentially changed or "dirty."

For an example of the efficiency gained by using the DRL, assume that the primary volume is 100 GB and is divided into 1 GB blocks. Further assume that only one of the blocks is marked as dirty. If no DRL was used, the entire 100 GB of the primary volume would need to be compared with the secondary volume in order to resynchronize the two volumes. At a typical sequential access speed of 50 MB per second for a single disk, reading 100 GB of data on the primary volume would take over 33 minutes. In comparison, since the DRL indicates that only one block needs to be read, the read operation would only take 20 seconds. The need for such an optimization is more readily apparent when dealing with larger disk sizes typically encountered in an enterprise environment. As a second example, with 10 TB of primary storage, synchronizing the primary volume could take over two days (at a read speed of 50 MB per second) if no DRL is used.

During normal operation, write input/outputs (I/Os) are first tested against the current DRL to see if the region of the primary volume affected by the write operation is already "dirty." If it is, the write I/O is then immediately entered into the current write log and the write operations to the primary and secondary volumes are initiated. If the bit in the DRL corresponding to the write operation is clear, indicating that the region on the primary volume is "clean," then the bit is set (indicating a change to the primary data in that region) and the DRL is made persistent before the write operation is acknowledged. However, in an asynchronous implementation, the acknowledgement can occur before the secondary write is entered into the current write log. When the secondary volume acknowledges the write, the bit in the DRL is cleared.

The synchronous nature of the DRL change and commit is important. It is permissible for the DRL to have bits set even if data changes did not occur to the primary volume (e.g., the write I/O fails or is not issued due to a software failure), but it is not permissible for the DRL to have bits which are clear if there is a chance that the corresponding regions on the primary volume may have been changed.

Periodically as determined by policy, the DRL is reset by clearing all the bits in the map except for the bits representing regions of the primary volume for which uncommitted write I/Os exist (e.g., in write logs in memory but not yet written to disk). During certain critical phases of the re-synchronization workflow, it is important that the DRL be prevented from resetting. This is accomplished indirectly by manipulating the write log. The DRL reset policy will not allow the DRL to be reset when either the write log is not active or the write log is active but currently "Out of Sync." Deactivating the write log or inserting an "Out of Sync" marker into an active write log effectively disables DRL resets, while inserting an "In Sync" marker into an active write log effectively enables them.

During re-synchronization, regions on the primary volume corresponding to "dirty" bits in the DRL are compared to secondary volume data as mapped by the most recent reliable PIT map. The re-synchronization function can then bring the secondary volume data into agreement with the primary volume data if they are found to be different.

It is noted that there is a natural tension between the latency introduced by synchronous DRL writes (required when new regions of the primary volume are "dirtied") and the time required to re-synchronize the data after a failure. Over time, as the DRL fills with "dirty" bits, the fewer synchronous writes of the DRL are required, reducing the average I/O latency. However, the more filled the DRL becomes with "dirty" bits, the more regions of the primary volume must be scanned during re-synchronization. Resetting the DRL too frequently will reduce the time needed to re-synchronize at the expense of increased latency, while too few DRL resets will reduce latency at the expense of an overly long recovery time. The trade-off between latency and recovery time is handled by the DRL reset policy.

Re-Baseline

The re-baseline procedure is used to fill in the gaps where the data protection system, including the DRL, has failed. In general, the re-baseline procedure operates similar to the creation of an initial snapshot, with the main difference being that only a fraction of the data has changed. Because certain optimizations exist, it is only necessary to fill in the gap in time where the failure occurred.

Over time, it is possible (although unlikely) that errors will accumulate within the data protection system with the result that the data on the primary and secondary volumes will no longer be in sync. The re-baseline procedure is a mechanism for detecting discrepancies between the primary and secondary volumes, marking suspect point-in-time intervals, and bringing the volumes back into synchronization. The re-baseline procedure can be run at any time to check the integrity of the primary and secondary volumes, and can fix any problems found in the background.

In general terms, the re-baseline procedure scans the entire primary and secondary volumes for data miscompares. When they are found, errors are corrected by copying data from the primary volume to the secondary volume and creating a "fix-up" delta map placed at the end of the delta map chain being maintained for the primary volume. The fix-up delta map brings the two volumes back into synchronization and restores any point in time (APIT) data protection. From this point in the map chain, the re-baseline procedure searches back through the map chain until it arrives at a map before which there are no errors. The interval (delta map sub-chain) between the earliest error-free map and the fix-up map is marked as being not reliable.

The re-baseline procedure introduces the concept of a "suspect" delta map, which is the system's way of delineating an interval of maps in the delta map chain through which errors have propagated. The suspect interval begins with the first map for which errors have been detected and continues forward in time until the fix-up delta map is reached. Each map within the interval is marked as suspect (except for the fix-up map), whether it contains mappings to regions with errors or not.

The significance of a suspect map is that if it is the most recent map in a map merge operation, the resulting merged map is also suspect. A suspect map merged with a more recent fix-up map results in a clean (non-suspect) map. A suspect map may only be merged with a more recent suspect map or a more recent fix-up map, i.e., it is by definition impossible to have a more recent non-suspect map other than a fix-up map adjacent to a suspect map in the map chain. While merging two suspect maps would result in a suspect merged map, it is still desirable to create the most recent image of the delta map even in the suspect time period. The reason for this is that if a user attempts to recover the volume to a time within this period, the user will be presented with a warning, but will still be permitted to examine the volume. It is possible that the specific blocks or files the user is looking for have not been corrupted. The map manager uses the suspect map marker to keep track of how reliable various composite maps are when they are built from the fundamental delta map chain elements.

Figure 3A:
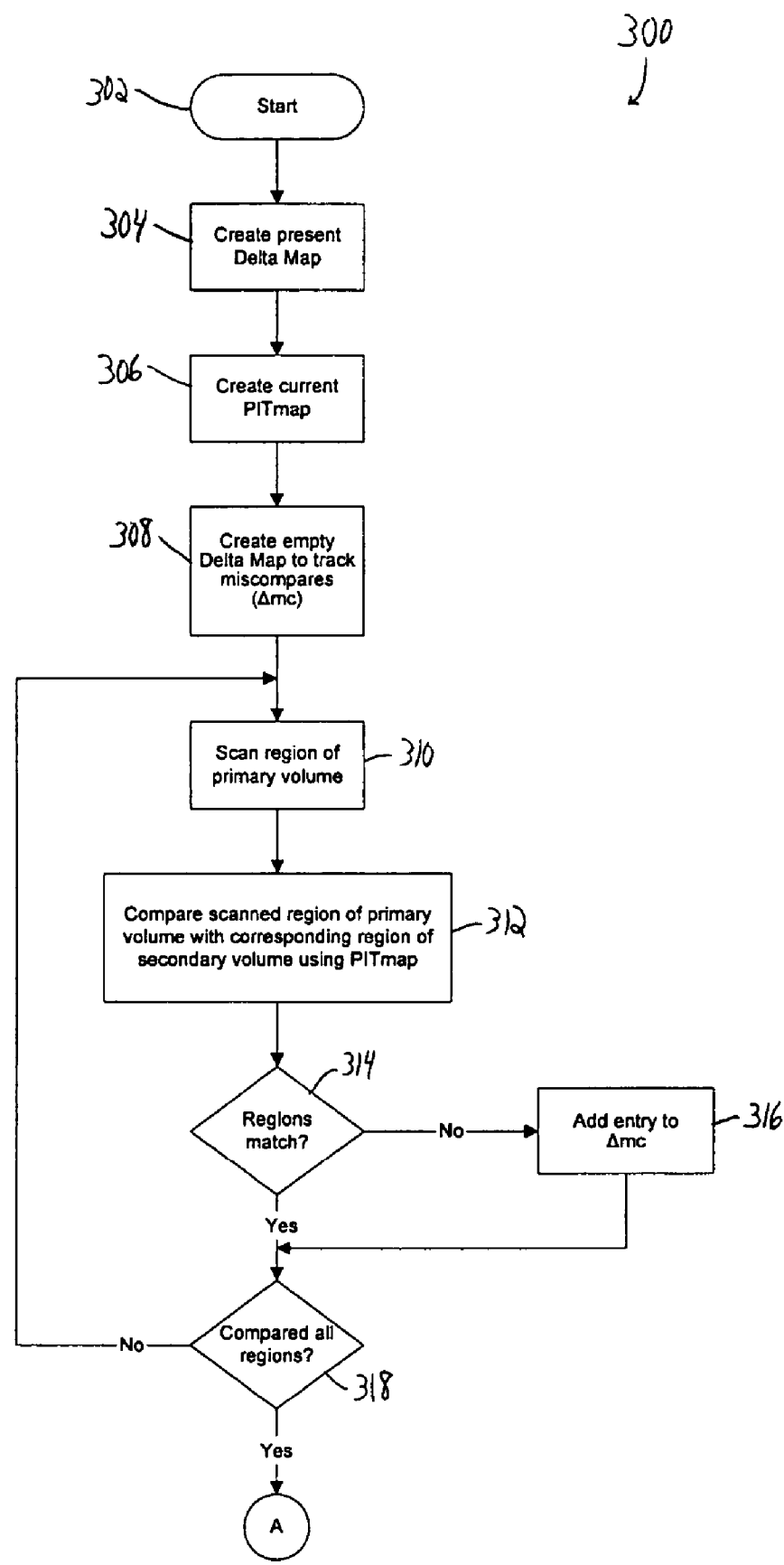
FIGS. 3A-3C are flowcharts of a re-baseline procedure in accordance with the present invention.
Figure 3B:
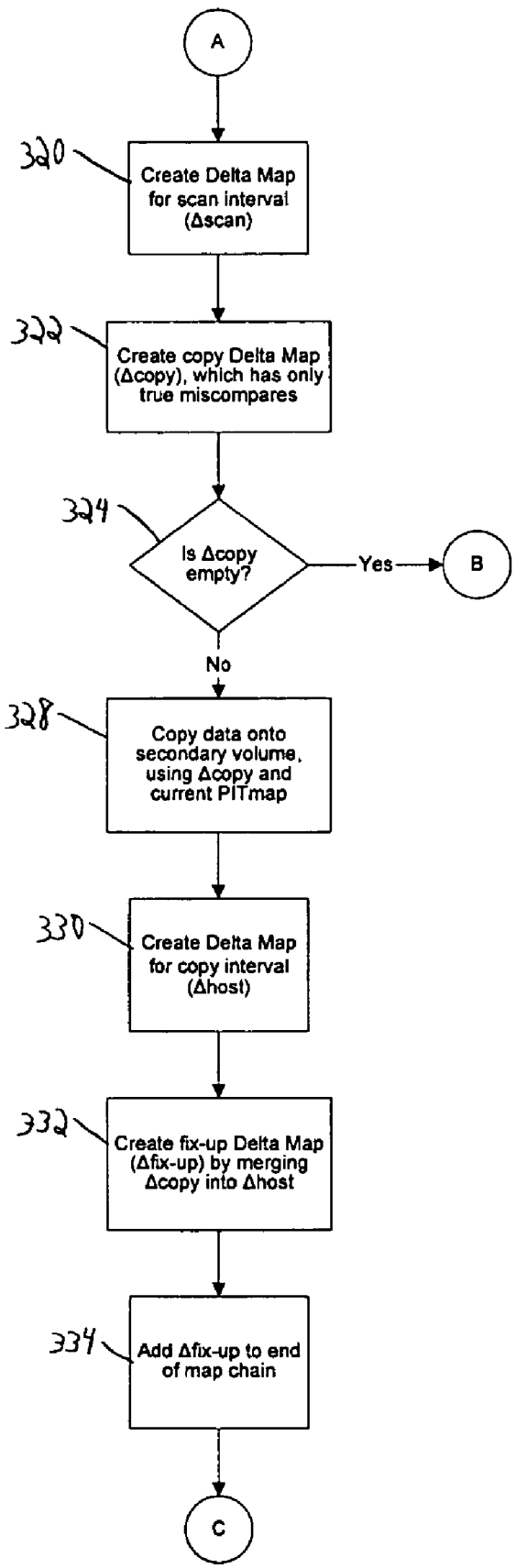
Figure 3C:
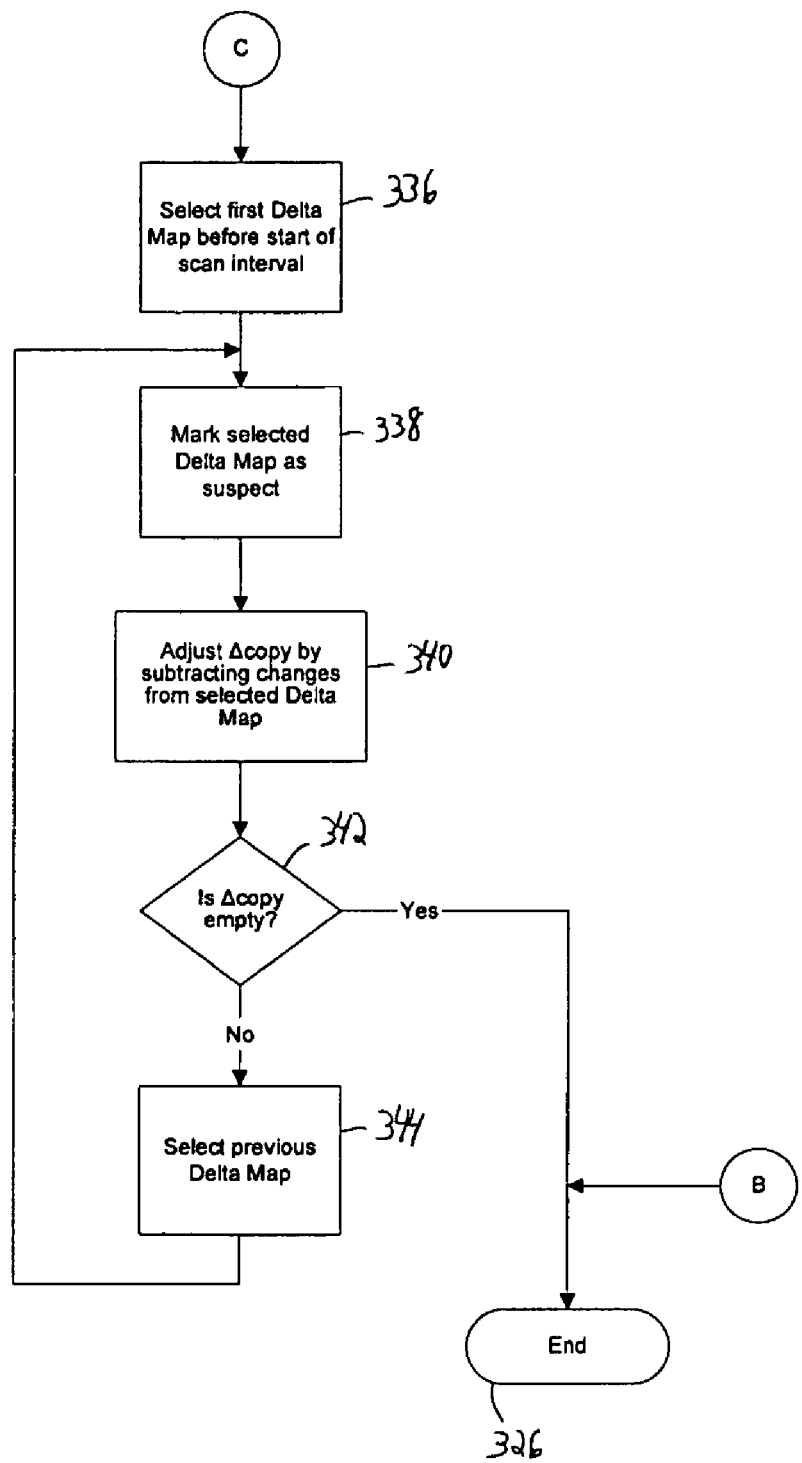
Figure 4:
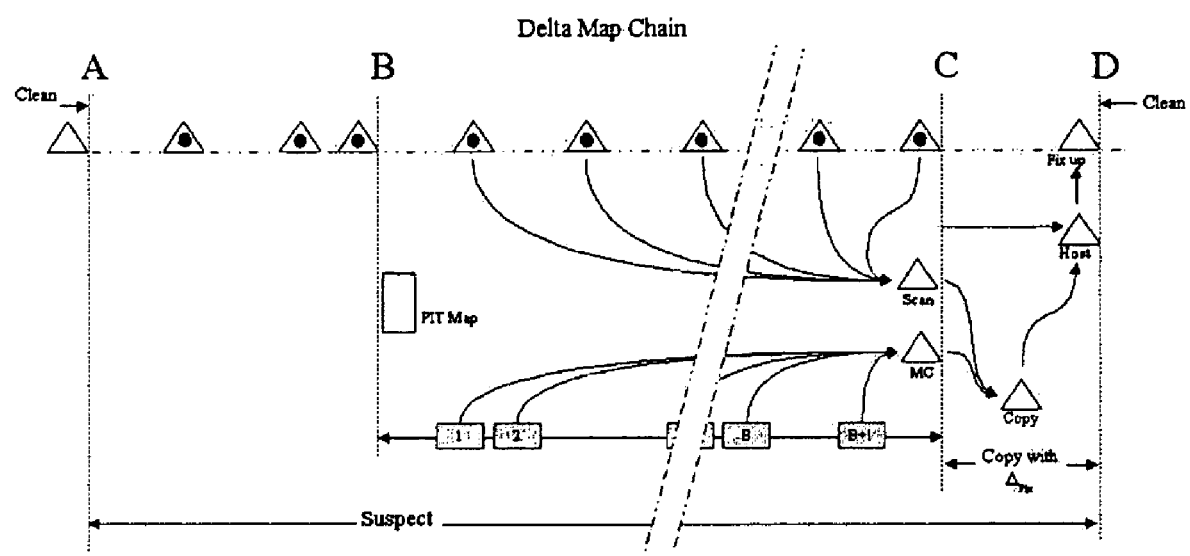
FIG. 4 is a diagram of a delta map chain in connection with the re-baseline procedure shown in FIGS. 3A-3C.
Figure 1A:
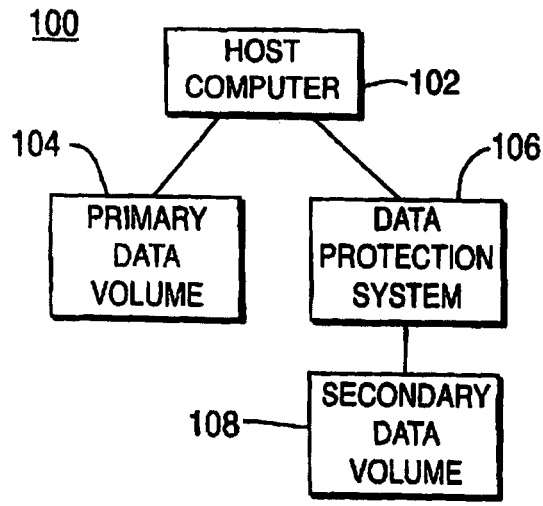
Figure 1B:
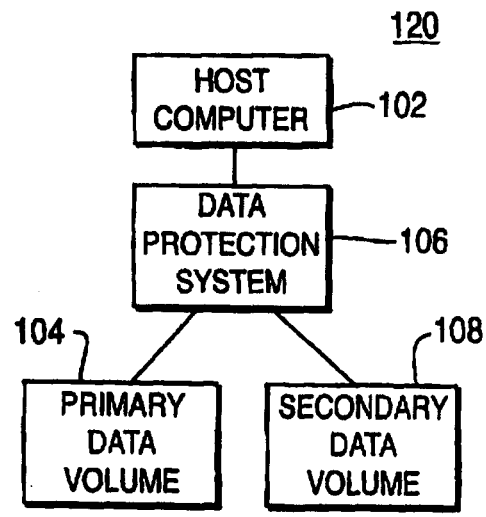
Figure 1C:
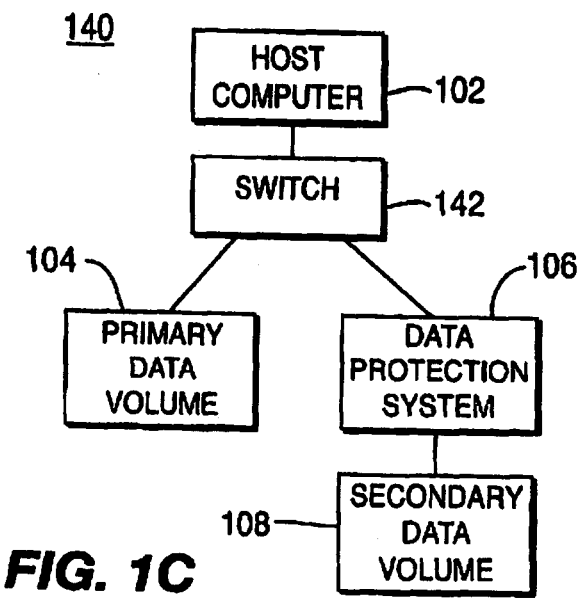
Figure 2:
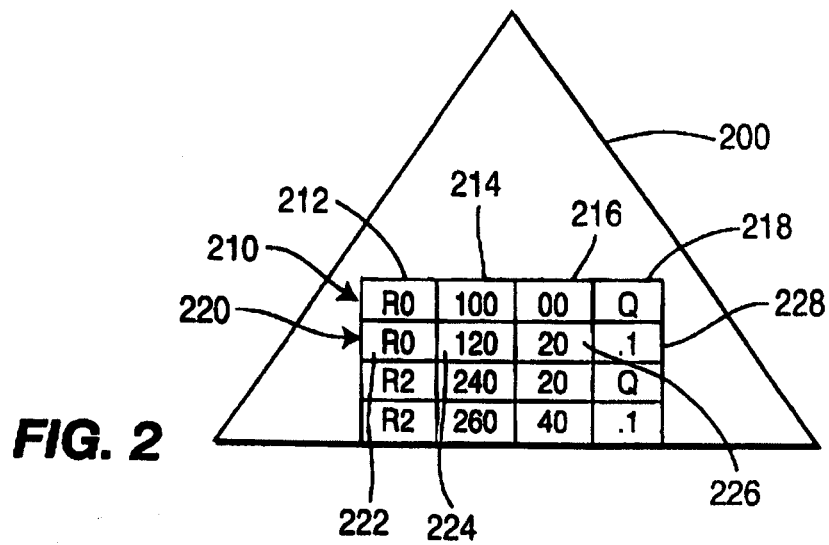
Figure 3A:
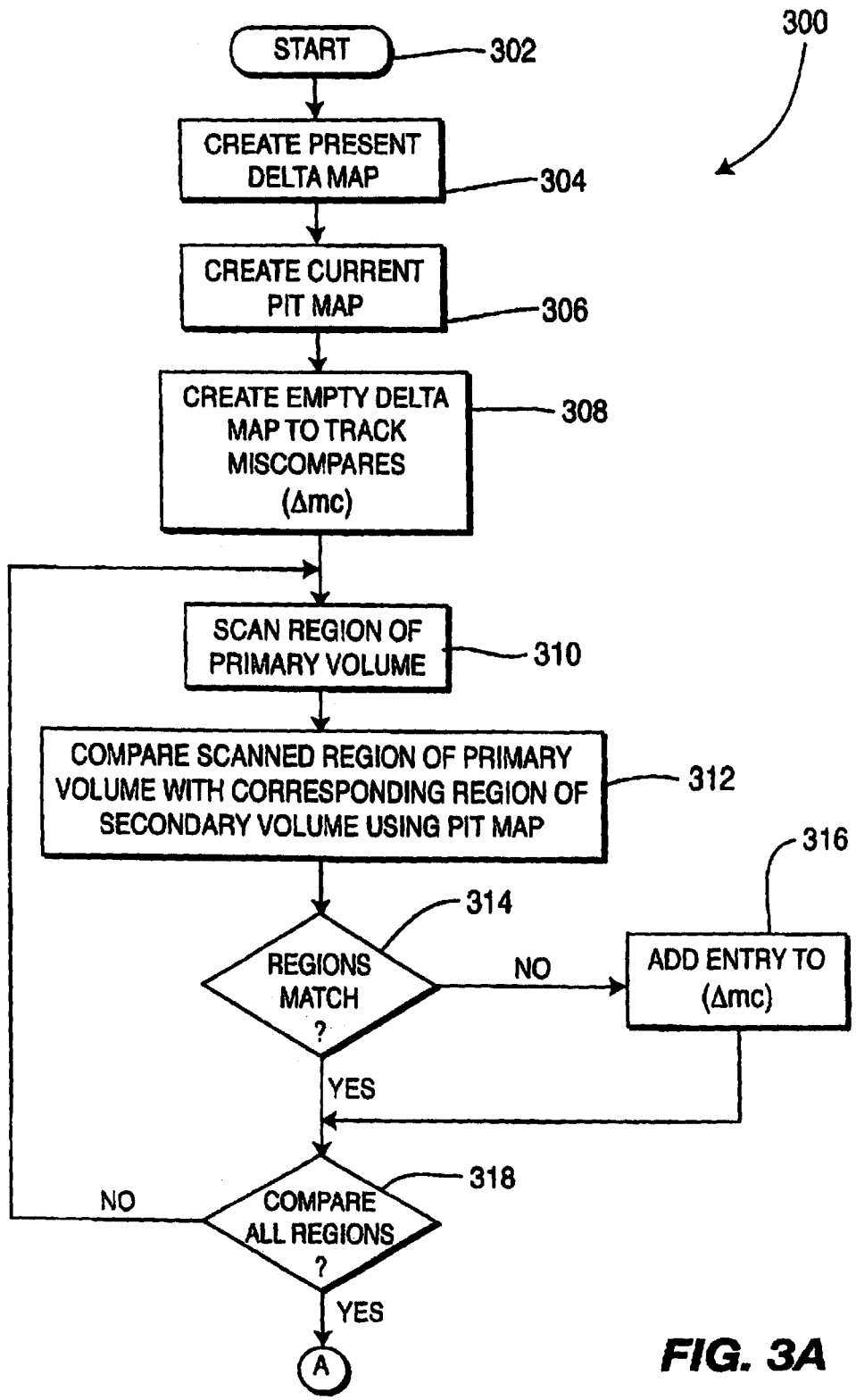
Figure 3B:
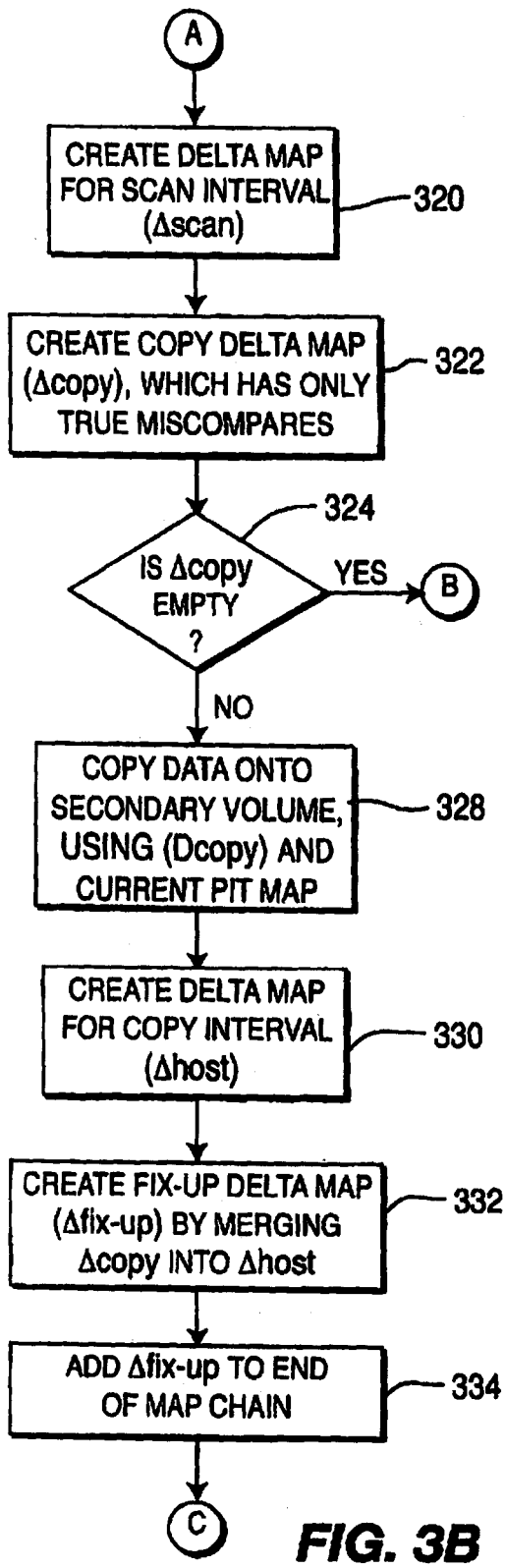
Figure 3C:
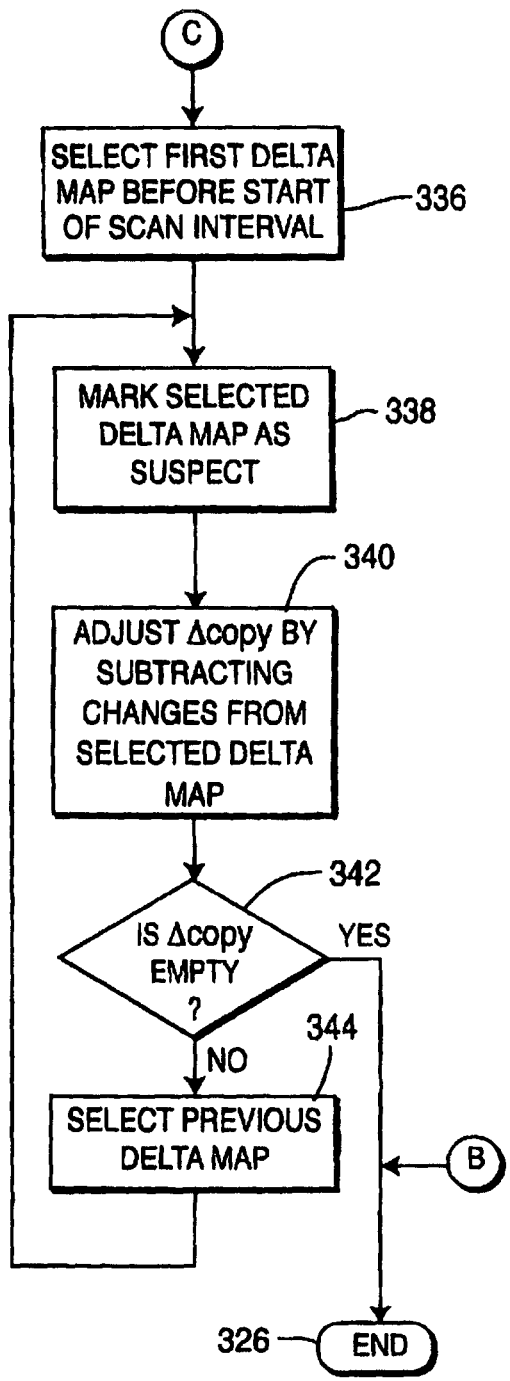
Figure 4:
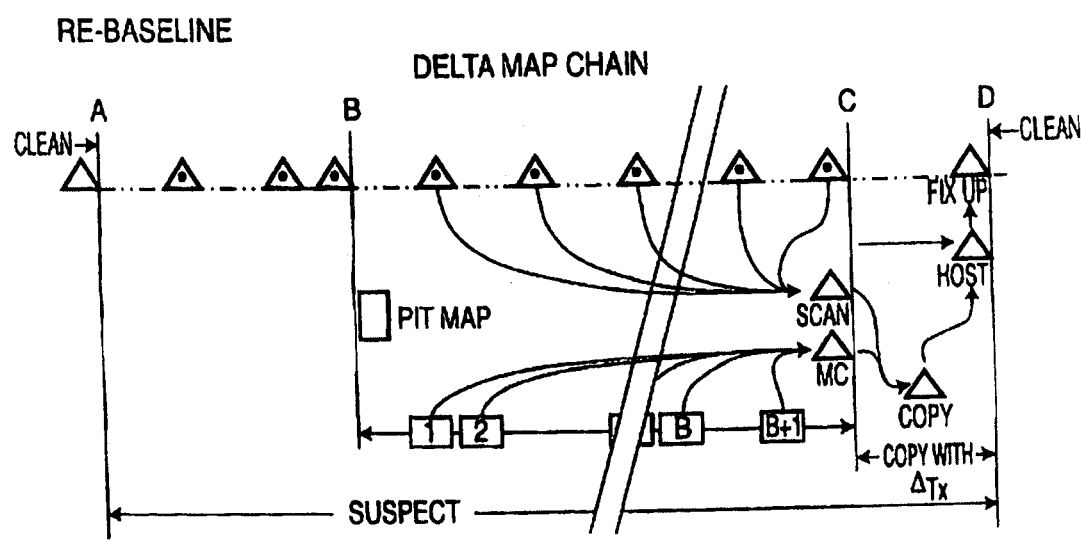

FIGS. 3A-3C show flowcharts describing the steps of the re-baseline procedure 300, which is also graphically represented from a delta map perspective in FIG. 4. The following discussion uses all of these figures to explain the re-baseline procedure 300.

The re-baseline procedure 300 begins (step 302; point B in FIG. 4) by creating a current delta map covering from the last delta map in the map chain to the present time (step 304). A current PIT map is created by merging all of the delta maps in the map chain prior to and including the current delta map (step 306); this process may be optimized by utilizing pre-merged delta maps. The PIT map is used for comparing the primary volume data and secondary volume data as they exist at the present time. While the PIT map is utilized, the entire primary volume still needs to be scanned to properly complete the re-baseline procedure.

A miscompare delta map ($\Delta$mc) is created to track any miscompares (step 308). A region of the primary volume is scanned (step 310) and the scanned region is compared with the corresponding region of the secondary volume as indicated by the PIT map (step 312). This part of the process (steps 310 and 312) can be optimized in some situations by utilizing the DRL. Care must be taken when dealing with suspect volumes, because the DRL may not provide accurate information, and therefore cannot be used. If the DRL is current, then the re-synchronization procedure can be used, as discussed below. The safest method is to scan the entire volume, especially since the scanning can be performed in the background while the system is processing other requests. It is possible to use checkpoints such that one region of the volumes can be scanned and compared at a time, and if the system fails for some reason during the scan and compare steps, it will not be necessary to restart the entire re-baseline procedure from the beginning.

A determination is made whether the regions on the primary and secondary volumes match (step 314). If the regions do not match, this indicates that there is a miscompare between the primary and secondary volumes, and an entry is made into the miscompare delta map (step 316). If the regions match (step 314), then there are no miscompares between the two regions. Regardless of the outcome of step 314, another decision is made whether all of the regions of the primary and secondary volumes have been compared (step 318). As noted above, the DRL may be used to optimize this decision by only looking at the regions marked as "dirty" in the DRL. If all of the regions on the primary volume have not been compared, then the procedure continues at step 310.

If all of the regions on the primary volume have been compared (step 318), then a scan delta map ($\Delta$scan) is created for the scan interval (between points B and C in FIG. 4; step 320). The scan delta map is created by merging any delta maps that exist from the time the re-baseline procedure was started and the present time. Because host write activity has continued during the scan interval, some of the changes to the primary volume data may have resulted in miscompares and corresponding entries in the miscompare delta map. These miscompares do not represent errors (they represent new writes to the primary volume) and need to be removed from the miscompare delta map.

A copy delta map ($\Delta$copy) is created to store only the true miscompares between the primary and secondary volumes (step 322). In order to bring the primary and secondary volumes into agreement, data must be copied from the primary volume to the secondary volume for those areas where true miscompares have been identified. The copy delta map is used to guide the copy process by factoring out any changes made to the primary volume during the scan interval that may have resulted in false miscompares. This map is constructed by subtracting from the miscompare map ($\Delta$mc) the intersection of the miscompare map ($\Delta$mc) and the scan interval map ($\Delta$scan), as shown in Equation 1.

$$\Delta copy = \Delta mc - (\Delta mc \cap \Delta scan) \quad \text{Equation (1)}$$

A determination is made whether the copy delta map is empty (step 324). If the copy delta map is empty, indicating that there are no true miscompares between the primary and secondary volumes (i.e., that the primary and secondary volumes are synchronized), then the procedure terminates (step 326).

If the copy delta map is not empty (step 324), then data from the primary volume is copied onto the secondary volume for those areas where miscompares were detected, overwriting the areas on the secondary volume, using the copy delta map and the current PIT map (step 328; between points C and D in FIG. 4). A host change delta map ($\Delta$host) is created for the copy interval to track the new changes made during the copy interval (step 330).

A fix-up delta map ($\Delta$fix-up) is created by merging the copy delta map into the host change delta map (step 332), as shown in Equation 2.

$$\Delta \text{fix-up} = \Delta host \leftarrow \Delta copy \quad \text{Equation (2)}$$

The fix-up delta map is then added to the end of the delta map chain (step 334). The fix-up delta map is used to bring the primary and secondary volumes into synchronization since it includes all of the changes made to the primary volume from the beginning of the scan interval (point B in FIG. 4) and to restore the map chain to reliable PIT capability (point D in FIG. 4).

Because the copy delta map is not empty, errors existed in the delta map chain prior to the beginning of the scan interval (point B in FIG. 4), and all delta maps within the scan interval are suspect. The first delta map before the start of the scan interval (to the left of point B in FIG. 4) is selected (step 336). The selected delta map is marked as suspect (step 338). The copy delta map is adjusted by subtracting the changes in the selected delta map ($\Delta$selected) from the copy delta map (step 340) and as shown in Equation 3.

$$\Delta copy = \Delta copy - (\Delta copy \cap \Delta selected) \quad \text{Equation (3)}$$

A determination is made whether the adjusted copy delta map is now empty (step 342). If the copy delta map is empty, indicating that there are no additional suspect delta maps to locate, then the procedure terminates (step 326). If the copy delta map is not empty (step 342), then the previous delta map in the map chain is selected (step 344) and the procedure continues with step 338. The point in the delta map chain preceding the earliest delta map to be marked as suspect (point A in FIG. 4) is the beginning of the suspect interval for the map chain.

Re-Synchronization

If the DRL is correct (meaning that the data protection system has not failed) and the secondary volume fails, then a re-synchronization procedure can be used to update the secondary volume. The re-synchronization procedure operates in the same manner as the re-baseline procedure described above in connection with FIGS. 3A-3C, with the main difference being that the re-synchronization procedure is able to use the DRL to optimize the scan and compare steps (steps 310 and 312). As a result of these optimizations, the scan interval will be shorter since only those regions contained in the DRL need to be scanned and compared.

Full Restore

The full restore procedure is used to place a snapshot onto the primary volume, in the event of a primary volume failure. Data is copied from the snapshot into the primary volume. It is possible to roll forward changes in the data from the time of the snapshot to the present time, at the user's preference. With appropriate file system decoders, it is even possible to selectively apply changes to certain data (i.e., a user can roll forward changes on a particular file), so the full restore procedure may function like a concurrent version system, as is used in software development.

The idea of a full restore is that once a user has selected a particular snapshot, the corresponding content (i.e., the new volume) is moved back to the primary volume, overwriting the corrupted contents there. If a host-based agent or service on a storage switch is used, requests to regions that have already been copied back to the primary volume can be served from there (and thus faster), whereas requests for blocks that have not been copied are served from the secondary volume. This makes the restore process invisible to the user, with the only noticeable difference being that initial requests will be a bit slower than usual.

While specific embodiments of the present invention have been shown and described, many modifications and variations could be made by one skilled in the art without departing from the scope of the invention. The above description serves to illustrate and not limit the particular invention in any way.

What is claimed is:

1. A method for synchronizing a secondary volume with a primary volume in a continuous data protection system, comprising the steps of:
    scanning a region of the primary volume;
    comparing the scanned region with a corresponding region of the secondary volume;
    storing an identification of the scanned region in a compare delta map when the comparing step results in a discrepancy between the scanned region and the corresponding region;
    copying data from the primary volume to the secondary volume, using the compare delta map as a guide to locate the data to copy; and
    revising the compare delta map by removing any changes made to the primary volume during a scan interval, which is the period of time required to scan the primary volume, the revising step being performed before the copying step.

2. The method according to claim 1, further comprising the step of:
    repeating the scanning, comparing, and storing steps for each region of the primary volume.

3. The method according to claim 1, further comprising the steps of:
    creating a present delta map, covering the changes made to the primary volume from the time of the previous delta map in a delta map chain to the time the method was begun;
    creating a point in time (PIT) map based upon the present delta map; and
    wherein the creating steps are performed prior to the scanning step.

4. The method according to claim 3, wherein the comparing step uses the PIT map to determine which region of the secondary volume is compared to the scanned region of the primary volume.

5. The method according to claim 1, wherein the scanning and comparing steps are optimized by using a dirty region log, wherein only those regions of the primary volume that are listed in the dirty region log are scanned and compared.

6. The method according to claim 5, wherein the dirty region log includes only the regions of the primary volume that have been modified but not yet committed to the secondary volume.

7. The method according to claim 1, wherein the revising step includes:
    creating a scan delta map, including the changes made to the primary volume during the scan interval; and
    subtracting the entries in the scan delta map from the compare delta map.

8. The method according to claim 1, wherein the copying step includes using the revised compare delta map as a guide to locate the data to copy.

9. The method according to claim 1, further comprising the steps of:
    creating a host change delta map, including any changes made to the primary volume during a copy interval, which is the period of time required to complete the copying step;
    merging the revised compare delta map into the host change delta map, to create a fix-up delta map; and
    inserting the fix-up delta map into the end of the delta map chain.

10. The method according to claim 1, further comprising the steps of:
    selecting the first delta map prior to the start of the scan interval;
    marking the selected delta map as suspect;
    adjusting the revised compare delta map by subtracting the changes contained in the selected delta map; and
    selecting the previous delta map in the delta map chain and repeating the marking and adjusting steps until the revised compare delta map is empty.

* * * * *

UNITED STATES PATENT AND TRADEMARK OFFICE
CERTIFICATE OF CORRECTION

PATENT NO. : 7,426,617 B2
APPLICATION NO. : 10/772642
DATED : September 16, 2008
INVENTOR(S) : Stager et al.

It is certified that error appears in the above-identified patent and that said Letters Patent is hereby corrected as shown below:

The sheets of drawings consisting of figures 1-4 should be deleted to appear as per attached figures 1-4.

Signed and Sealed this
Third Day of January, 2012

David J. Kappos
*Director of the United States Patent and Trademark Office*